United States Patent
Bär et al.

(10) Patent No.: US 7,798,739 B2
(45) Date of Patent: Sep. 21, 2010

(54) CONNECTION ARRANGEMENT

(75) Inventors: Andreas Bär, Lampertheim (DE); August Kriebernegg, Köflach (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 280 days.

(21) Appl. No.: 11/974,529

(22) Filed: Oct. 12, 2007

(65) Prior Publication Data

US 2008/0092682 A1   Apr. 24, 2008

(30) Foreign Application Priority Data

Oct. 16, 2006   (DE)   ................ 10 2006 048 855

(51) Int. Cl.
F16B 2/00   (2006.01)
(52) U.S. Cl. ................ 403/354; 403/397; 403/DIG. 14
(58) Field of Classification Search ................ 403/329, 403/397, DIG. 14, 9, 21–22, 109.8, 243, 403/280–282, 288, 354, 401, 268, 292, 295, 403/294, 382, 267, 403; 73/114.36; 74/63, 74/335; 123/337; 338/116; 340/456
See application file for complete search history.

(56) References Cited

U.S. PATENT DOCUMENTS

| | | | | |
|---|---|---|---|---|
| 2,805,876 A * | 9/1957 | Aylor et al. | ................ | 403/354 |
| 2,972,493 A * | 2/1961 | Waters | ................ | 403/354 |
| 3,130,990 A * | 4/1964 | Leitmann | ................ | 403/357 |
| 3,169,032 A * | 2/1965 | Pastor | ................ | 403/354 |
| 3,342,273 A * | 9/1967 | Crane | ................ | 416/204 R |
| 3,512,222 A * | 5/1970 | Tinnerman | ................ | 24/561 |
| 3,999,356 A * | 12/1976 | Packman | ................ | 403/282 |
| 4,048,741 A * | 9/1977 | Chiodo et al. | ................ | 42/70.11 |
| 4,113,399 A * | 9/1978 | Hansen, Sr. | ................ | 403/329 |
| 4,884,052 A * | 11/1989 | Eitoku et al. | ................ | 338/202 |
| 5,106,277 A * | 4/1992 | Tuckey | ................ | 417/423.1 |
| 5,297,892 A * | 3/1994 | Preziosa | ................ | 403/231 |
| 5,403,034 A * | 4/1995 | Gans et al. | ................ | 280/728.3 |
| 5,512,820 A * | 4/1996 | Alfors | ................ | 324/207.22 |
| 5,867,092 A | 2/1999 | Vogt | | |
| 6,145,870 A * | 11/2000 | Devane et al. | ................ | 280/728.2 |
| 6,421,881 B1 * | 7/2002 | Shovlin | ................ | 16/441 |
| 6,658,960 B2 | 12/2003 | Babin et al. | | |
| 6,877,390 B2 | 4/2005 | Tsuzuki et al. | | |
| 2004/0135574 A1 * | 7/2004 | Hagio et al. | ................ | 324/207.25 |

FOREIGN PATENT DOCUMENTS

DE   34 38 718 C2   4/1986
DE   196 23 287 A1   1/1997

* cited by examiner

*Primary Examiner*—Victor MacArthur
(74) *Attorney, Agent, or Firm*—Harness, Dickey & Pierce, P.L.C.

(57) ABSTRACT

The invention relates to a connection arrangement in which two parts can be coupled to a corresponding engagement means without play. A connection device having at least one elastically resilient portion is located in the engagement region of the two engagement means, the elastically resilient portion being stressed based on the coupling of the two parts due to deformation such that the two parts are in mutual engagement without play. Furthermore, a latch element is formed at the elastically resilient portion or at another resilient portion in the engagement region of the two engagement means. The latch element serves as a transport lock and as an installation aid and latches the second part in a predetermined relative position with respect to a third part before the coupling of the two parts.

21 Claims, 2 Drawing Sheets

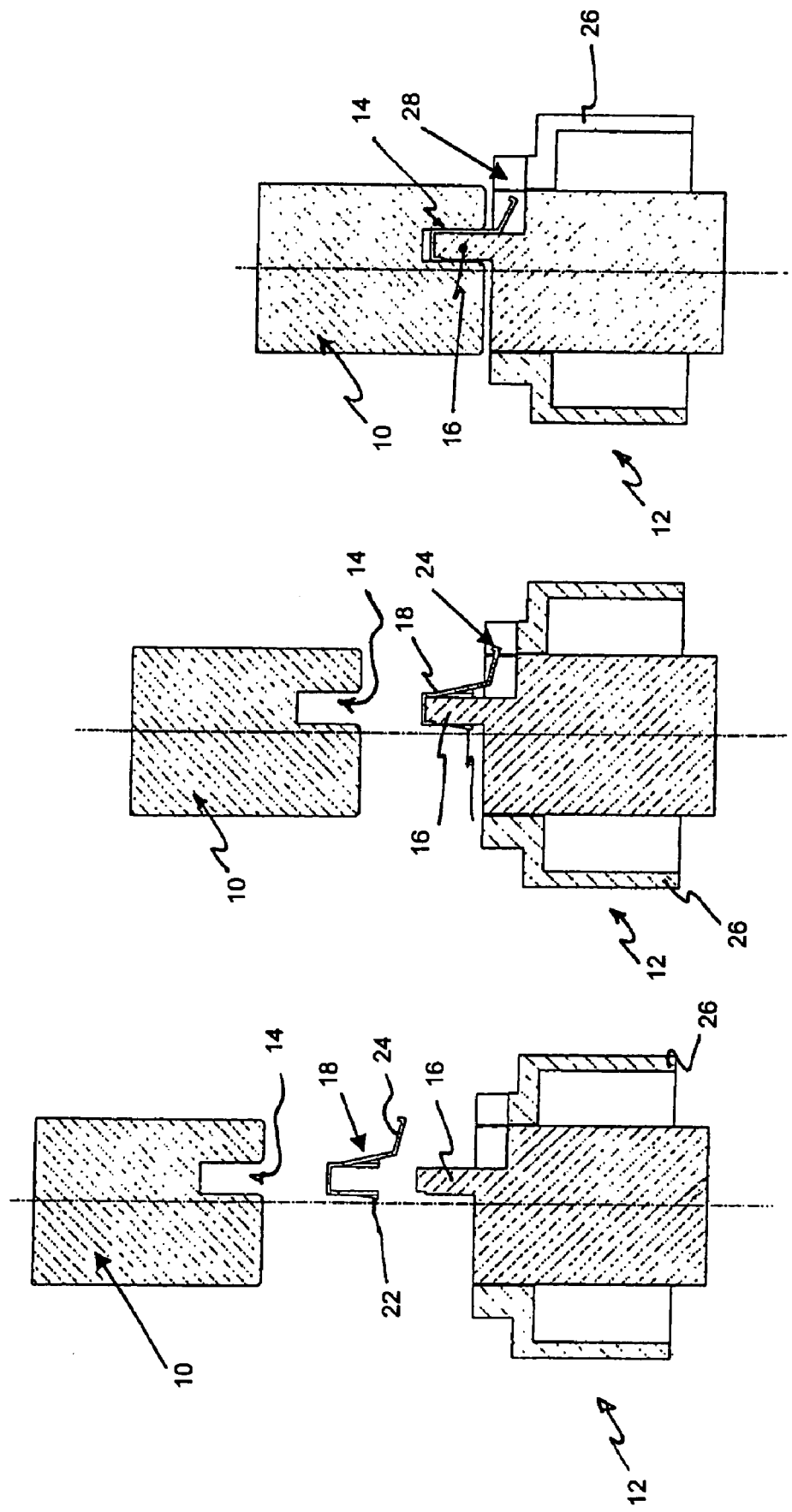

CONNECTION ARRANGEMENT

CROSS-REFERENCE TO RELATED APPLICATIONS

Figure 1:
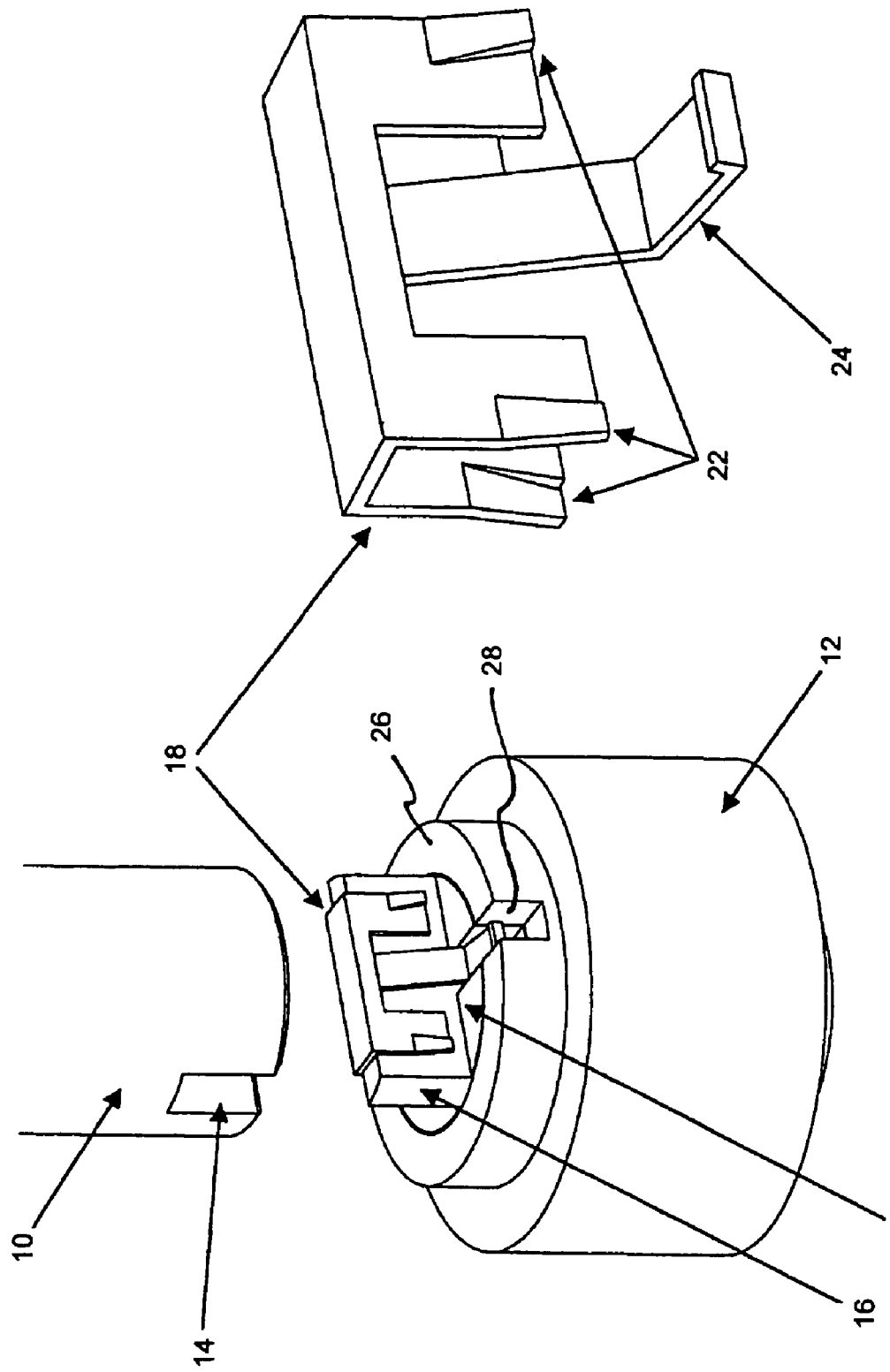

This application claims the benefit of DE 10 2006 048 855.5 filed Oct. 16, 2006. The disclosure of the above application is incorporated herein by reference.

BACKGROUND

The present invention relates to a connection arrangement in which a first part may be coupled to a second part. The two parts each have an engagement means which can be brought into mutual engagement such that the two parts are coupled via the two engagement means. The second part is movably connected to a third part of the connection arrangement.

Such connection arrangements may be required, for example, for a transmission unit to couple an actuator element to a sensor element of an angular position sensor or of a linear sensor to determine the position of the actuator element. Such an arrangement may be beneficial for control purposes of the actuator mechanism of the transmission unit. Since it is not always possible or is too complex and/or expensive for technical production reasons to match the two engagement means of the two parts to be connected to one another with an exact fit, the engagement means can have slight play tolerances which can, however, result in unwanted measuring inaccuracies. In addition, a formation of the two engagement means with a completely exact fit can make the coupling procedure more difficult.

The movability of the second and third parts relative to one another can also make the assembly more difficult if the engagement means of the second part is not aligned as expected with respect to the engagement means of the first part due to an unexpected offset of the second part relative to the third part. Furthermore, damage may occur due to vibrations during transport before the coupling of the second part to the third part due to the movability of the second and third parts relative to one another, particularly if these two parts form a sensor. The measuring accuracy of the sensor can also suffer thereby on the making of the second and third parts as a sensor.

SUMMARY

It is an object of the present invention to couple two parts to one another without play with simple means and to simultaneously provide a transport lock.

This object may be satisfied by a connection device located in the engagement region of the two engagement means which has at least one elastically resilient portion which is stressed based on the coupling of the first and second parts by one of the engagement means due to deformation such that the two parts are mutually in engagement without play. Furthermore, a latch element is formed at the elastically resilient portion or at a further resilient portion in the engagement region of the two engagement means. The latch element serves as a transport lock and as an assembly aid and secures the second part in a predetermined relative position with respect to the third part before the coupling of the first and second parts.

The at least one resilient portion compensates for residual play which may be present between the engagement means of the first and second parts by a deformation which is applied to it on the mutual engagement of the two engagement means so that no or only very small play tolerances remain. Furthermore, the manufacture of the parts and the mutual coupling of the first and second parts can be simplified by the provision of the resilient portion or portions in the engagement region of the two engagement means since the two engagement means do not have to be matched to one another with an absolutely exact fit, which facilitates an introduction of the two engagements means into one another.

As already mentioned, the second part can be a sensor element which is movable with respect to the third part such as a fixed housing portion. It is advantageous in this case to lock the sensor element during transport so that the sensor does not suffer any damage due to vibrations. In order, however, not to have to provide any additional transport lock which has to be removed again before the assembly or coupling of the sensor to the first part, the latch element is provided at the elastically resilient portion or at a further resilient portion in the engagement region of the two engagement means to secure the second part, made as a sensor element for example, with respect to the third part made as a sensor housing, for example, in a predetermined relative position.

Since the latch element has elastically resilient properties, the latch element can automatically unlock the second part from the third part on the mutual coupling of the first and second parts as a result of a deformation during the coupling procedure. A particularly simple and reliable handling is thereby ensured. Furthermore, due to the latching, the second part, which is movable with respect to the third part, is always located in the same position on the installation of the first and second parts, whereby the risk of a defective coupling can be reduced. The latch therefore acts as a transport lock, on the one hand, and as an assembly aid, on the other hand, so that it is not necessary to provide different means for these two purposes.

Advantageous aspects and further developments of the transmission unit in accordance with the invention result from the claims, the description and the drawings.

For example, one of the engagement means can thus be made as a groove and the other engagement means can be made as a tongue, whereby the two parts can be mutually coupled in a shape-matched manner by inserting the tongue into the groove. The two engagement means can be distal end portions of the two parts which are matched to one another in accordance with a male/female connector system to produce the engagement bond. The one part made as a sensor, for example, can in this manner be easily coupled to the other part made as an actuator means, for example, without further assembly steps being necessary.

In accordance with a further embodiment, the resilient portion can, for example, be made as a projecting, i.e. laterally protruding, spring plate which is aligned such that it is increasingly deformed during the coupling procedure of the first part with the second part. The spring plate ultimately comes into contact with the two engagement means during the coupling procedure, whereby the spring plate is deformed precisely so much that no more play occurs between the two engagement means.

In accordance with a preferred embodiment, the connection device is made as a separate coupling element which is located between the two engagement means in the coupled state of the first and second parts and which is equipped with the resilient portion or portions. Alternatively, it is possible to make the resilient portions of the latch plate in one piece with one of the two engagement means, for example at the tongue of the one part.

In accordance with an advantageous embodiment, the coupling element is made as a U-shaped connecting clip which is clamped onto one of the two parts in the uncoupled state of the first and second parts. A captive (secure against loss) pre-assembly of the coupling element can thereby be ensured, and the actual coupling of the two parts can be made more simple and reliable.

In accordance with a preferred embodiment of the connection arrangement, the first part can, for example, be a rotatably supported shaft and the second part can likewise be a rotatably supported, shaft-like component. The first part can thus, for example, be an actuator shaft of a transmission unit, with the actuator shaft having different rotary positions in dependence on which a power transmission unit such as a torque transmission clutch of a transfer case unit, a reduction gear unit or a manual transmission of an all-wheel drive and/or a lock of a differential transmission unit of the transmission unit is switched to active. Since it is generally desirable to be able to determine the angular position of such an actuator shaft as precisely as possible in order to be able to draw a conclusion on the state of the respective power transmission unit, the second part can be the rotor of an angular position sensor which is rotationally fixedly coupled to the actuator shaft without play in an axial extension of the actuator shaft. In this respect, the third part can be a housing portion of the angular position sensor in which the second part made as a rotor is rotatably supported.

Since there is a possibility that the second part is coupled to the first part in a position rotated by 180°, for example, due to the previously explained plug connection between the first part and the second part made as a rotor, there is a need to avoid such a faulty assembly since otherwise falsified measured results could be delivered by the angular position sensor. To counter this, the two engagement means can be made asymmetrical with respect to the common axis of rotation of the first part and of the second part, in particular eccentric thereto. It can thereby be ensured that there is only one correct angular position in which the rotor of the angular position sensor can be coupled to the actuator shaft. It can thus be ensured that the sensor is coupled to the actuator shaft in a reliable manner in a predetermined relative position.

Alternatively, the second and third parts can be a sensor element and a sensor housing which are movable in an axial direction relative to one another as a linear position sensor.

DRAWINGS

The invention will be explained by way of example with reference to the enclosed Figures. The Figures only show an exemplary embodiment and should not be understood as restricting the protective scope. Elements which are the same or which correspond to one another are marked by the same reference numerals in all Figures.

FIG. 1 is a perspective representation in the region of the coupling of three parts; and FIGS. 2 to 4 depict different assembly states during the coupling of the three parts.

DETAILED DESCRIPTION

In FIGS. 1 to 4, the coupling between a first part made as an actuator shaft 10 and a second part of an angular position sensor 12 made as a rotor 20 is shown by way of example. The rotor 20 is connected to a third part of the connection arrangement made as a sensor housing 26 in a permanent, but rotationally movable manner. It must, however, be stressed at this point that the coupling shown here between the actuator shaft 10 and the rotor 20 of an angular position sensor 12 is a purely exemplary embodiment of the connection arrangement in accordance with the invention and that other parts, such as an axially movable element of a linear sensor, can also be coupled to a corresponding actuator using the connection arrangement in accordance with the invention.

As can be seen from FIGS. 1 to 4, the actuator shaft 10 has a groove 14 at its free end face. The end face of the rotor 20 opposite it is provided with a nose or tongue 16 which is made substantially complementary to the groove 14 of the actuator shaft 10. As can in particular be seen from FIGS. 2 to 4, the tongue 16 has a somewhat smaller width than would correspond to the clear width of the groove 14 so that a coupling element 18 can be arranged in the engagement region between the groove 14 and the tongue 16, as will be explained more precisely.

To avoid a faulty assembly in which the rotor 20 is coupled to the actuator shaft 10 rotated, for example, by 180°, both the groove 14 and the tongue 16 are arranged eccentrically at the respective parts 10, 20, which precludes a faulty assembly of the rotor 20 rotated by 180°.

The embodiment of the connection arrangement in accordance with the invention in the engagement region between the groove 14 and the tongue 16 will be looked at in more detail which permits a rotationally fixed coupling, free of play, of the rotor 20 to the actuator shaft 10.

The possibility admittedly exists of matching the design of the groove 14 to the design of the tongue 16 with such an exact fit that practically no play occurs between these two engagement means, but a production with such an exact fit makes the coupling of the angular position sensor 12 to the actuator shaft 10 more difficult so that in accordance with the invention the coupling element 18 is provided in the form of a U-shaped connecting clip 18. The coupling element 18 is equipped with four resilient portions 22 at the corner sides in the form of spring plates 22 and, as shown in FIG. 1, is clamped onto the tongue 16. The connecting clip 18 is thus located in the engagement region of the tongue 16 with the groove 14 in the coupled state of the angular position sensor 12 with the actuator shaft 10 so that the tongue 16 can be deliberately made slightly thinner than would correspond to the clear width of the groove 14.

As can be seen from FIGS. 2 and 3, the U-shaped connecting clip 18 has a slightly larger width in the region of the open end measured between the U-hoops from spring plate 22 to spring plate 22 than would correspond to the clear width of the groove 14 and it thus has a specific oversize with respect to the groove 14.

The rotor 20 of the angular position sensor 12 can thus be coupled without play via the tongue 16 with the connecting clip 18 clamped thereon to the actuator shaft 10 or the end groove 14 formed thereon, as the transition between FIGS. 3 and 4 shows. In FIG. 3, the connecting clip 18 is shown clamped onto the tongue 16, with the spring plates 22 still giving the connecting clip 18 a slightly larger width than would correspond to the clear width of the groove 14. If the tongue 16 with the connecting clip 18 clamped thereon is now introduced into the groove 14, the spring plates 22 come into contact with the contour of the groove 14 during the coupling procedure and thus increasingly deform during the coupling procedure as a consequence of their elastic properties. A precise coupling results such that the tongue 16 is rotationally fixedly in engagement with the groove 14 without play. Due to the interposition of the connecting clip 18, it is thus not necessary to match the groove 14 to the tongue 16 with a completely exact fit since any play tolerances can be compensated in this manner.

The spring tension achieved between the mutually connected first part and second part is preferably selected such that it is always larger than the forces or torques occurring in operation between the first part and the second part.

In the embodiment shown in the Figures, the connecting clip 18 has, in addition to the four spring plates 22 arranged at the corners, a further spring plate 22 which merges into a latch element 24 at its free end. This latch element 24 serves to lock the rotor 20 rotationally fixedly with respect to the sensor housing 26 during transport. For this purpose, the sensor housing 26 has a recess 28 in which the latch element 24 latches, as FIGS. 1 and 3 show.

If the tongue 16 is now introduced with the connecting clip 18 clamped into the groove 14 (transition from FIG. 3 to FIG. 4), this has the result that not only the four spring plates 22 at the corner sides, but also the fifth spring plate 22 connected to the latch element 24 comes into contact with the contour of the groove 14 and is deformed like the four corner plates 22. The latch element 24 is urged back out of the recess 28 as a consequence of this deformation of the fifth spring plate 22 so that the latched connection between the housing 26 and the rotor 20 is automatically disconnected when the angular position sensor 12 is coupled to the actuator shaft 10, without additional transport locks having to be removed.

Finally, it must be mentioned that an additional fifth spring plate 22 is provided in the embodiment described and the latch element 24 is arranged thereat. The latch element can, however, naturally also be provided at another spring plate 22. Alternatively, it would also be possible to equip each of the spring plates 22 with a latch element 24, whereby a particularly secure transport lock is produced.

The invention claimed is:

1. A connection arrangement for a play-free coupling, comprising:
 a first part having one of a female member and a male member;
 a second part having the other of a female member and a male member which can be brought into engagement with each other such that the first and second parts are coupled to one another; and
 a third part moveable relative to the first part and movably connected to the second part;
 wherein the second part is connected to the first part via a connection device having at least one elastically resilient portion being provided in an engagement region of the first and second parts, said connection device being stressed based on the coupling of the first and second parts due to deformation such that the first and second parts are in mutual engagement without play, said connection device further having a latch element which serves as a transport lock and as an assembly aid being formed at the elastically resilient portion of the connection device, said latch element latching the second part in a predetermined relative position with respect to the third part before the coupling of the first and second parts.

2. A connection arrangement in accordance with claim 1, wherein the resilient portion is made as a projecting spring plate which is aligned such that it is increasingly deformed on the coupling of the first and second parts.

3. A connection arrangement in accordance with claim 1, wherein the connection element is made as a separate coupling element which includes the resilient portion.

4. A connection arrangement in accordance with claim 3, wherein the coupling element includes a U-shaped connecting clip clamped on one of the first and second parts.

5. A connection arrangement in accordance with claim 1, wherein the latch element unlocks the second part with respect to the third part based on the coupling of the first and second parts as a consequence of the deformation of the associated resilient portion.

6. A connection arrangement in accordance with claim 1, wherein the female member includes a groove and the male member includes a tongue.

7. A connection arrangement in accordance with claim 1, wherein the first part is a rotatably supported shaft.

8. A connection arrangement in accordance with claim 7, wherein the third part is a housing portion in which the second part is rotatably supported.

9. A connection arrangement in accordance with claim 7, wherein the male member and the female member are arranged eccentrically with respect to a common axis of rotation of the first and second parts.

10. A connection arrangement in accordance with claim 7, wherein the second part is a rotor of an angular position sensor.

11. A connection arrangement for a play-free coupling, comprising:
 a first part having one of female member and a male member;
 a second part having the other of said female member and said male member with said female member in receipt of said male member;
 a connection device having at least one elastically resilient portion positioned between said male member and said female member and being at least partially deformed to interconnect said first and second parts substantially without play therebetween; and
 a third part movably connected to said second part, said connection device including a latch operable in an undeformed first position to restrict relative movement between said second and third parts, said latch being deformed during interconnection of said first and second parts and moved from said first position to a second position where said second and third parts are allowed to move relative to one another.

12. A connection arrangement in accordance with claim 11 wherein said elastically resilient portion and said latch are integrally formed with one another.

13. A connection arrangement in accordance with claim 12 wherein said connection device includes a U-shaped portion at least partially enveloping said male member.

14. A connection arrangement in accordance with claim 11 wherein the first part is a rotatably supported shaft.

15. A connection arrangement in accordance with claim 14, wherein the third part is a housing portion in which the second part is rotatably supported.

16. A connection arrangement in accordance with claim 11 wherein said male member is arranged eccentrically relative to a common axis of rotation of said first and second parts.

17. A connection arrangement in accordance with claim 11 wherein said latch includes a leg positioned within a groove formed in said third part when located at said first position.

18. A connection arrangement for a play-free coupling, comprising:
 a first part having one of a female member and a male member; and
 a second part having the other of the female member and the male member which can be brought into engagement with each other such that the first and second parts are coupled to one another,
 wherein the second part is movably connected to a third part, the arrangement further including a connection device having at least one elastically resilient portion being provided in an engagement region of the first and second parts, said connection device being stressed based on the coupling of the first and second parts due to deformation such that the first and second parts are in mutual engagement without play, said connection device further having a latch element which serves as a transport lock and as an assembly aid being formed at the elastically resilient portion of the connection device, said latch element latching the second part in a predetermined relative position with respect to the third part before the coupling of the first and second parts, the latch element unlocking the second part with respect to the third part based on the coupling of the first and second parts as a consequence of the deformation of the associated resilient portion, wherein the first part is a rotatably supported shaft and the second part is a rotor of an angular position sensor.

19. A connection arrangement in accordance with claim 18 wherein said connection device includes a U-shaped portion at least partially enveloping said male member.

20. A connection arrangement in accordance with claim 18 wherein said male member is arranged eccentrically relative to a common axis of rotation of said first and second parts.

21. A connection arrangement for a play-free coupling, comprising:
- a first part having one of a female member and a male member;
- a second part having the other of said female member and said male member with said female member in receipt of said male member;
- a third part rotatably supporting said second part; and
- a connection device having at least one elastically resilient portion positioned between said male member and said female member and being at least partially deformed to interconnect said first and second parts substantially without play therebetween, said connection device having a latch operable in an undeformed first position to inhibit rotation of said second part relative to said third part, said latch being moved from said first position to a second position in response to interconnection of said first and second parts so as to permit rotation of said second part relative to said third part, wherein the first part is a rotatably supported shaft, and further wherein said male member is arranged eccentrically relative to a common axis of rotation of said first and second parts.

* * * * *